(12) United States Patent
Yamaguchi et al.

(10) Patent No.: US 8,939,045 B2
(45) Date of Patent: Jan. 27, 2015

(54) CONTROL PEDAL ASSEMBLY (75) Inventors: Ayumu Yamaguchi, Wako (JP);
Kiyohiro Mando, Wako (JP); Kenso Imamura, Wako (JP); Akio Matsuda, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 659 days.

(21) Appl. No.: 13/233,413

(22) Filed: Sep. 15, 2011

(65) Prior Publication Data

US 2012/0060642 A1   Mar. 15, 2012

(30) Foreign Application Priority Data

Sep. 15, 2010   (JP) .................................. 2010-207304

(51) Int. Cl.
*G05G 1/44* (2008.04)
*B60T 7/06* (2006.01)

(52) U.S. Cl.
CPC .... *B60T 7/06* (2013.01); *G05G 1/44* (2013.01)
USPC .............................................. 74/512; 74/560

(58) Field of Classification Search
USPC .......................................... 74/512–514, 560
See application file for complete search history.

(56) References Cited

U.S. PATENT DOCUMENTS

| | | | | |
|---|---|---|---|---|
| 6,666,106 B1* | 12/2003 | Hueges et al. | ................... | 74/514 |
| 6,805,022 B1* | 10/2004 | Steindl et al. | ................... | 74/513 |
| 6,834,564 B2* | 12/2004 | Huesges et al. | ................... | 74/513 |
| 7,278,337 B2* | 10/2007 | Solta | ............................... | 74/513 |
| 2011/0100153 A1* | 5/2011 | Kaijala et al. | ................... | 74/512 |

FOREIGN PATENT DOCUMENTS

| | | |
|---|---|---|
| JP | S64-8428 U | 1/1989 |
| JP | 2002-79844 | 3/2002 |
| JP | 2003-25865 | 1/2003 |
| JP | 2007-191009 | 8/2007 |

OTHER PUBLICATIONS

Japanese Office Action for corresponding JP Application No. 2010-207304, Dec. 26, 2011.
Japanese Office Action for corresponding JP Application No. 2010-207304, Apr. 12, 2012.

* cited by examiner

*Primary Examiner* — Thomas Diaz
(74) *Attorney, Agent, or Firm* — Mori & Ward, LLP (57) ABSTRACT

A control pedal assembly includes a pedal bracket, a control pedal, an urging device and a communicating portion. The pedal bracket is secured to a vehicle body and has a housing space. The control pedal is swingably supported by a support shaft disposed in the housing space of the pedal bracket. The urging device is to urge the control pedal toward a rear of a vehicle body. The communicating portion is provided at a rear of the support shaft relative to the vehicle body between the control pedal and the pedal bracket to connect a space above the control pedal and a space below the control pedal.

6 Claims, 11 Drawing Sheets

CONTROL PEDAL ASSEMBLY

CROSS-REFERENCE TO RELATED APPLICATIONS

The present application claims priority under 35 U.S.C. §119 to Japanese Patent Application No. 2010-207304, filed Sep. 15, 2010, entitled "Control Pedal Assembly". The contents of this application are incorporated herein by reference in their entirety.

BACKGROUND OF THE INVENTION

1. Field of the Invention

The present invention relates to a control pedal assembly.

2. Discussion of the Background

A vehicle control pedal assembly having an accelerator pedal that is swingably supported by a support shaft in a mounting base thereof, the mounting base having a surface (surface facing the pedal) facing the accelerator pedal formed in a convex shape and the accelerator pedal having a surface (surface facing the base) facing the mounting base formed in a convex shape, is known (for example, see Japanese Unexamined Patent Application Publication No. 2007-191009).

The vehicle control pedal assembly described above can use the convex-shaped surfaces to release dust or other foreign matter that has entered a space between the mounting base and the accelerator pedal to the outside.

As described above, the operability of the accelerator pedal can be ensured by preventing foreign matter from accumulating in a space between the convex-shaped surfaces.

A control pedal assembly that ensures operability of the accelerator pedal, having a housing space formed in a pedal bracket thereof in which an accelerator pedal base is housed and the accelerator pedal is swingably supported by a support shaft, is provided.

Such a control pedal assembly can make ingress of foreign matter into an accelerator side difficult due to the presence of the pedal bracket, thereby ensuring the operability of the accelerator pedal.

SUMMARY OF THE INVENTION

According to one aspect of the present invention, a control pedal assembly includes a pedal bracket, a control pedal, an urging device and a communicating portion. The pedal bracket is secured to a vehicle body and has a housing space. The control pedal is swingably supported by a support shaft disposed in the housing space of the pedal bracket. The urging device is to urge the control pedal toward a rear of a vehicle body. The communicating portion is provided at a rear of the support shaft relative to the vehicle body between the control pedal and the pedal bracket to connect a space above the control pedal and a space below the control pedal.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

The embodiments will now be described with reference to the accompanying drawings, wherein like reference numerals designate corresponding or identical elements throughout the various drawings.

Reference to "front (Fr)", "rear (Rr)", "left (L)", or "right (R)" is relative to a driver's position in the driver's seat.

Embodiment 1

A control pedal assembly 20 according to Embodiment 1 is described below.

Figure 1:
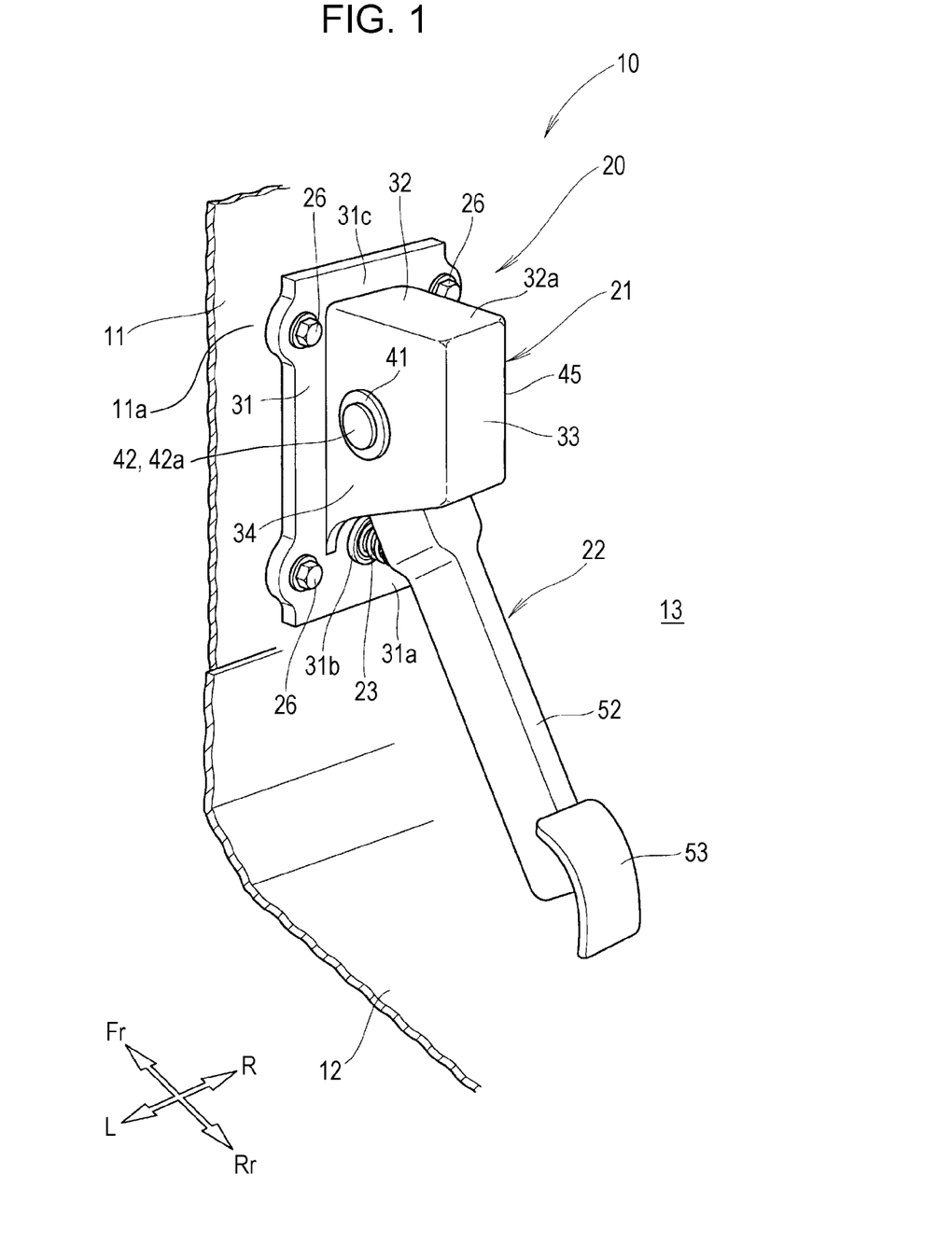
FIG. 1 is a perspective view of a control pedal assembly according to Embodiment 1 of the present invention.
Figure 2:
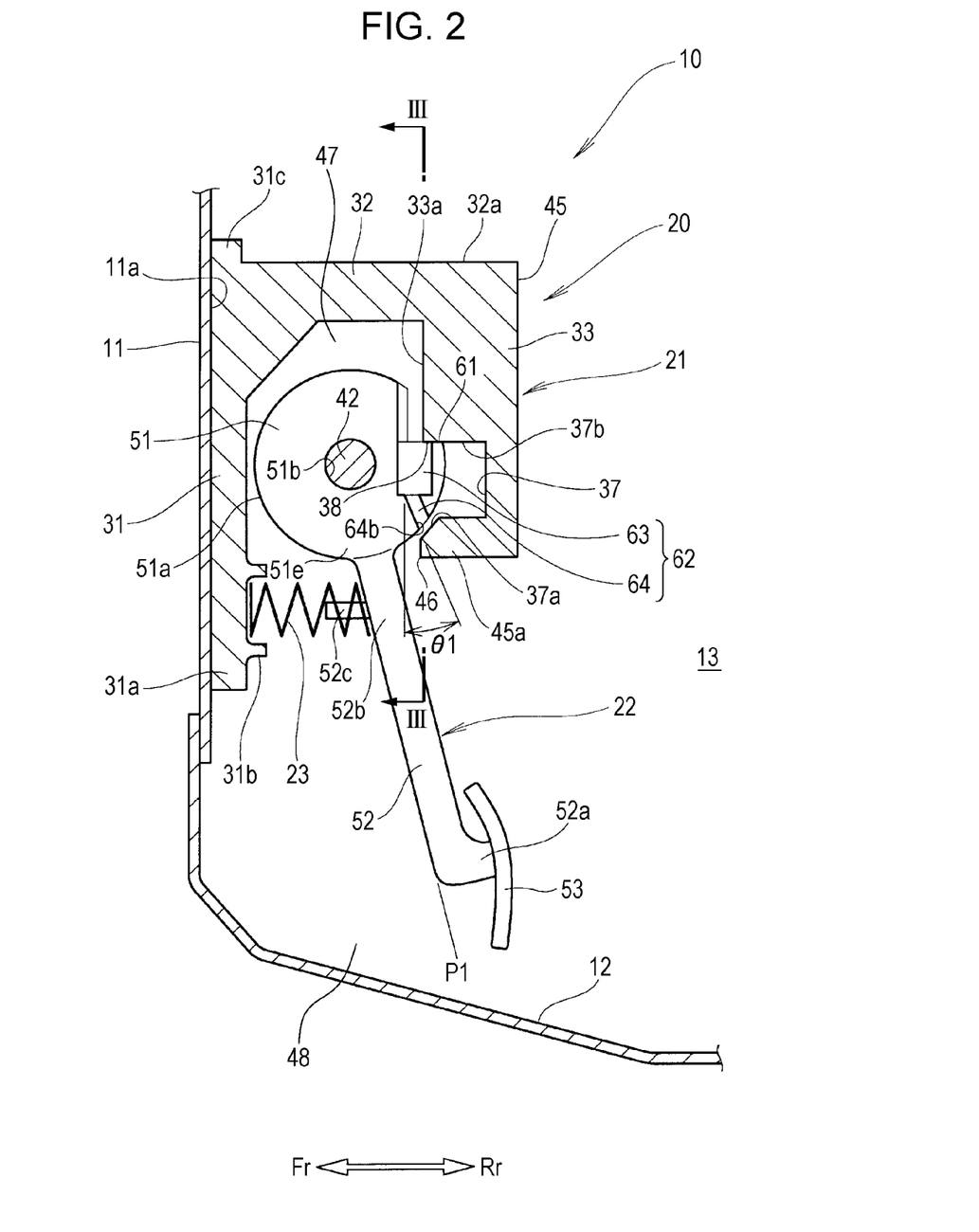
FIG. 2 is a cross-sectional view of the control pedal assembly of FIG. 1.

As shown in FIGS. 1 and 2, the control pedal assembly 20 is provided on a dashboard lower-section 11 of a vehicle body 10 so as to be disposed close to the feet of a driver in a passenger compartment 13.

The control pedal assembly 20 has a pedal bracket 21 secured to the vehicle body 10, an accelerator pedal (control pedal) 22 that is swingably supported by the pedal bracket 21, and a compression spring (urging device) 23 that urges the accelerator pedal 22 toward the rear of the vehicle body.

The pedal bracket 21 is secured to the vehicle body 10 (more specifically, a surface 11a of the dashboard lower-section 11) with a bolt 26 so as to be disposed in the passenger compartment 13.

Figure 3:
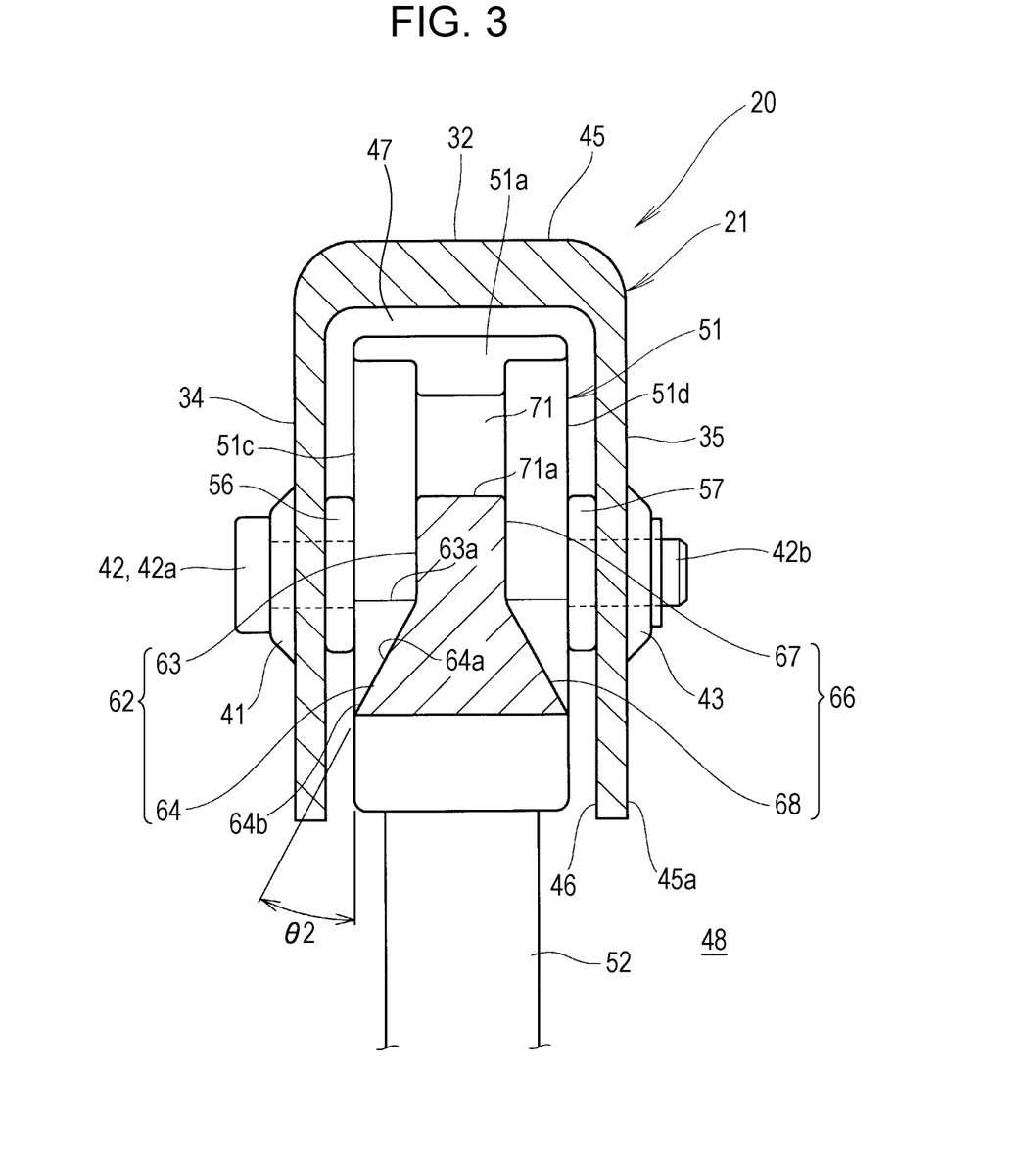
FIG. 3 is a view of section taken along line III-III of FIG. 2.

The pedal bracket 21 has a mounting plate 31, a upper wall 32, a rear wall 33, and side walls 34, 35 (see FIG. 3 for the right side wall 35).

The mounting plate 31 is secured to the surface 11a of the dashboard lower-section 11 with a bolt 26 so as to be disposed in the passenger compartment 13 and has a spring support 31b for supporting the compression spring 23 formed at a lower end 31a thereof.

The upper wall 32 extends toward the rear of the vehicle body from an upper end 31c of the mounting plate 31.

The rear wall 33 extends downward from a rear end 32a of the upper wall 32 and has a recessed portion 37 formed at a lower end of an inner surface 33a thereof and a slanted surface 37a formed at a lower end of an opening of the recessed portion 37.

The recessed portion 37 has a stopper 38 that is substantially horizontally formed in an upper surface 37b thereof.

The stopper 38 is provided in a housing space 47 of the pedal bracket 21 to restrict an operation amount of the accelerator pedal 22.

As shown in FIGS. 1 and 3, the left side wall 34 is provided on the left part of the mounting plate 31 in such a manner as to be adjacent to a left side of the upper wall 32 and a left side of the rear wall 33. The left side wall 34 has a boss 41 formed substantially in the middle thereof and has a head portion 42a of a support shaft 42 inserted through the boss 41.

The right side wall 35 and the left side wall 34 are arranged symmetrically. The right side wall 35 is provided on the right part of the mounting plate 31 in such a manner as to be adjacent to a right side of the upper wall 32 and a right side of the rear wall 33. The right side wall 35 has a boss 43 formed substantially in the middle thereof and has an end portion 42b of the support shaft 42 inserted through the boss 43.

As shown in FIGS. 2 and 3, the pedal bracket 21 has a casing-like body 45 formed by the mounting plate 31, the upper wall 32, the rear wall 33, and the left and right side walls 34, 35.

The casing-like body 45 has an opening 46 formed at a lower end 45a thereof and the housing space 47 formed therein. The housing space 47 communicates with an outside space 48 through the opening 46 formed at the lower end 45a of the casing-like body 45.

As shown in FIG. 2, a base 51 of the accelerator pedal 22 is housed in the housing space 47 of the pedal bracket 21 in which the accelerator pedal 22 is swingably supported by the support shaft 42.

The base 51 and the support shaft 42 are housed in the housing space 47 of the pedal bracket 21, thereby allowing the base 51 and the support shaft 42 (surrounding members of the support shaft 42) to be covered with the pedal bracket 21.

This arrangement makes dust or other foreign matter ingress into the base 51 difficult even in strong winds.

The accelerator pedal 22 has the base 51 supported by the support shaft 42, an arm 52 extending obliquely downward toward the rear of the vehicle body, and an pedal 53 provided at a lower end 52a of the arm 52.

Figure 4:
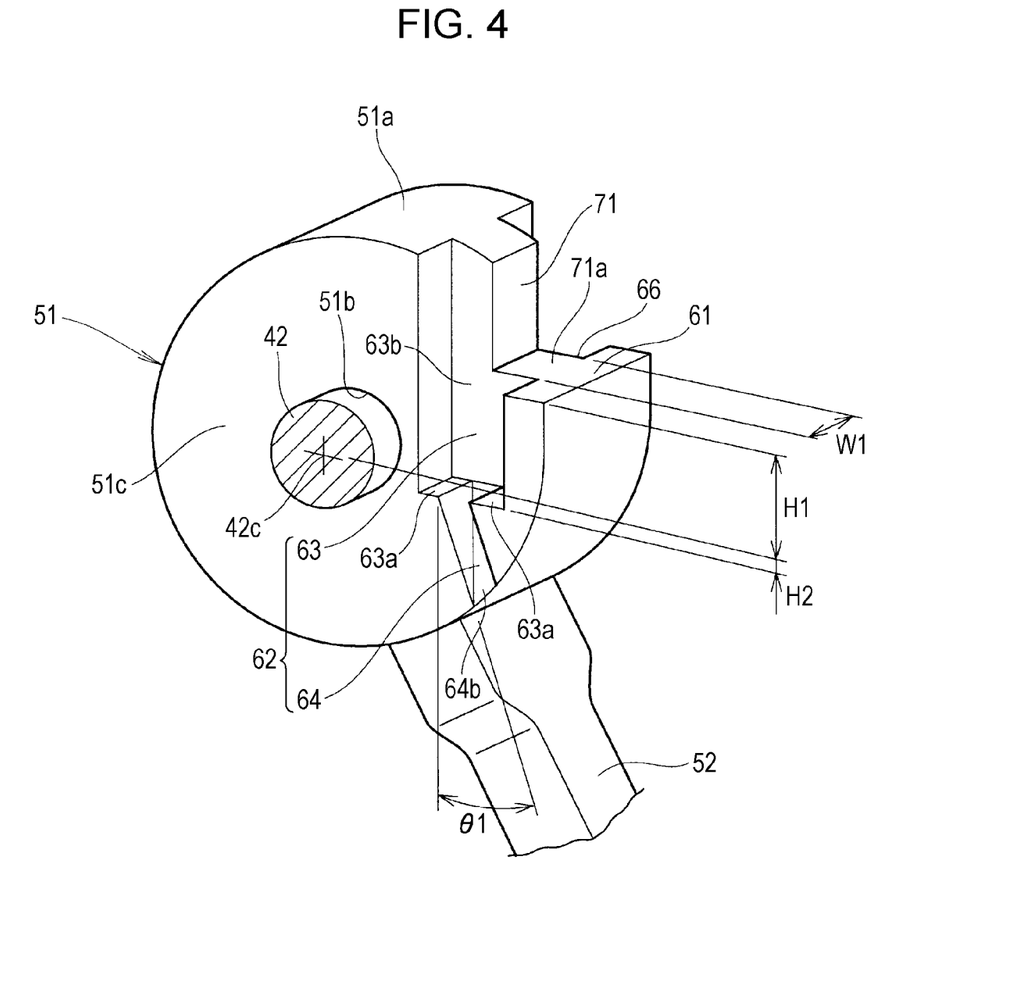
FIG. 4 is a perspective view of a base of a control pedal according to Embodiment 1.

As shown in FIGS. 3 and 4, the base 51 has a circumferential portion 51a formed in a substantially circular shape as seen from the side and a supporting hole 51b penetrating therethrough in the middle thereof. The support shaft 42 is inserted through the supporting hole 51b.

The support shaft 42 is supported at the head portion 42a thereof by the boss 41 of the left side wall 34 and at the end portion 42b thereof by the boss 43 of the right side wall 35.

A left spacer 56 is mounted between the left side wall 34 and a left side 51c (side of the pedal) of the base 51. Also, a right spacer 57 is mounted between the right side wall 35 and a right side 51d (side of the pedal) of the base 51.

With this arrangement, the base 51 is disposed in the housing space 47 of the pedal bracket 21 and the support shaft 42 is disposed in the housing space 47 (see FIG. 2).

The base 51 has a regulating portion 61 that can come into contact with the stopper 38 (see FIG. 2) at the rear of the support shaft 42 relative to the vehicle body and has left and right communicating portions 62, 66 formed between the regulating portion 61 and the support shaft 42.

The regulating portion 61 is horizontally formed at the rear of the support shaft 42 relative to the vehicle body in a substantially V-shaped recess 71 formed in the circumferential portion 51a of the base 51 in such a manner as to be located adjacent to the circumferential portion 51a at a height H1 above a center 42c of the support shaft 42.

In other words, the regulating portion 61 is formed of part of a lower end 71a of the substantially V-shaped recess 71. A width W1 of the lower end 71a is set relatively narrower.

Making the width W1 of the lower end 71a relatively narrow can prevent dust or other foreign matter from accumulating on the lower end 71a.

The regulating portion 61 is provided in the housing space 47.

As shown in FIG. 2, the operation amount of the accelerator pedal 22 can be regulated by causing the regulating portion 61 to come into contact with the stopper 38.

Regulating the operation amount of the accelerator pedal 22 allows the accelerator pedal 22 to be held at a pedal non-depressed position (initial pedal position) P1.

As shown in FIGS. 3 and 4, the left communicating portion 62 is formed at the rear of the support shaft 42 relative to the vehicle body in such a manner as to be located just under the regulating portion 61 between the base 51 and the pedal bracket 21 (left side wall 34).

The left communicating portion 62 communicates with a space (namely, housing space 47) above the base 51 and a space (namely, space 48 outside of the casing-like body 45) below the base 51.

With this arrangement, if dust or other foreign matter, enters the housing space 47 of the pedal bracket 21, the foreign matter can be released to the outside space 48 through the left communicating portion 62.

This arrangement prevents the foreign matter that has entered the housing space 47 of the pedal bracket 21 from accumulating on the regulating portion 61, thereby ensuring the operability of the accelerator pedal 22.

In addition, the left communicating portion 62 is formed just under the regulating portion 61.

With this arrangement, foreign matter that has entered the housing space 47 of the pedal bracket 21 can be released to the outside space 48 through the left communicating portion 62 provided just under the regulating portion 61.

This arrangement prevents the foreign matter that has entered the housing space 47 from accumulating on the regulating portion 61, thereby ensuring the operability of the accelerator pedal 22 associated with the release of pedal force from a depressed position of the accelerator pedal 22.

The left communicating portion 62 has a groove portion 63 formed in the left side 51c of the base 51 and a slanted guide portion 64 extending downward from the groove portion 63.

The groove portion 63 is formed so as to extend downward in the left side 51c.

More specifically, the groove portion 63 is formed in such a manner that its upper end can communicate with the circumferential portion 51a of the base 51 and the substantially V-shaped recess 71 and that its lower end 63a is located a distance H2 below the center 42c of the support shaft 42. The lower end 63a of the groove portion 63 is substantially horizontally formed just under the regulating portion 61.

The bottom portion 63b of the groove portion 63 is formed so as to be substantially in parallel with the left side 51c of the base 51.

The slanted guide portion 64 extends downward from the lower end 63a of the groove portion 63.

The slanted guide portion 64 descends at an angle of θ1 in the left side 51c of the base 51 so as to extend toward the rear of the vehicle body from the middle of the lower end 63a of the groove portion 63, and a bottom portion 64a descends at an angle of θ2 so as to extend laterally outward (toward the left side) from the middle of the lower end 63a of the groove portion 63.

An outlet port 64b of the slanted guide portion 64 opposes (is face-to-face with) the slanted surface 37a of the rear wall 33 (see FIG. 2).

As described above, the slanted guide portion 64 is configured to descend at an angle of θ1 toward the rear of the vehicle body. With this configuration, when the accelerator pedal 22 is depressed forward, the slanted guide portion 64 can be moved downward. Causing the slanted guide portion 64 to move downward allows the slanted guide portion 64 to be exposed to the outside space 48 through the opening 46 provided at the lower portion of the pedal bracket 21.

This configuration allows dust or other foreign matter that has entered the groove portion 63 to be optimally released to the outside space 48 of the pedal bracket 21 via the slanted guide portion 64.

In addition, the bottom portion 64a of the slanted guide portion 64 is configured to descend at an angle of θ2 so as to extend laterally outward (toward the left side) from the middle of the lower end 63a of the groove portion 63.

With this arrangement, dust or other foreign matter that has entered the groove portion 63 is guided through the slanted guide portion 64 so as to go away from the accelerator pedal 22 and be released through the opening 46.

This arrangement prevents the foreign matter from accumulating on the accelerator pedal 22 or around the opening 46.

Like the left communicating portion 62, the right communicating portion 66 is formed at the rear of the support shaft 42 relative to the vehicle body in such a manner as to be located just under the regulating portion 61 between the base 51 and the pedal bracket 21 (right side wall 35).

The right communicating portion 66 communicates with a space (namely, housing space 47) above the base 51 and a space (namely, space 48 outside of the casing-like body 45) below the base 51.

The right communicating portion 66 has a groove portion 67 formed in the right side 51d of the base 51 and a slanted guide portion 68 extending downward from the groove portion 67.

The right communicating portion 66 and the left communicating portion 62 are bilaterally symmetric, and detailed description of the right communicating portion 66 is omitted.

As shown in FIG. 2, the arm 52 extends downward toward the rear of the vehicle body from the lower end 51e of the base 51 and has a spring support 52c formed at an upper end 52b thereof.

The pedal 53 that is provided at the lower end 52a of the arm 52 in such a manner as to be disposed above a floor 12 is a component on which the driver depresses with his/her foot.

The compression spring 23 is mounted between the spring support 52c of the arm 52 and the spring support 31b of the mounting plate 31.

The compression spring 23 urges the accelerator pedal 22 toward the rear of the vehicle body.

Causing the compression spring 23 to urge the accelerator pedal 22 toward the rear of the vehicle body brings the regulating portion 61 of the base 51 into contact with the stopper 38 of the pedal bracket 21.

This arrangement allows the accelerator pedal 22 to be held at the pedal non-depressed position (initial pedal position) P1.

When the driver depresses the pedal 53 held at the pedal non-depressed position (initial pedal position) P1, the accelerator pedal 22 swings toward the front of the vehicle body.

The amount of fuel to be supplied to the engine can be adjusted by adjusting the operation amount of the accelerator pedal 22.

Next, an example of releasing the foreign matter 74 that has entered the housing space 47 of the control pedal assembly 20 is described below with reference to FIGS. 5A to 7. Since the left and right communicating portions 62, 66 are bilaterally symmetric, only the left communicating portion 62 is described with reference to FIGS. 5A to 7 for ease of understanding how the foreign matter is released.

Figure 5A:
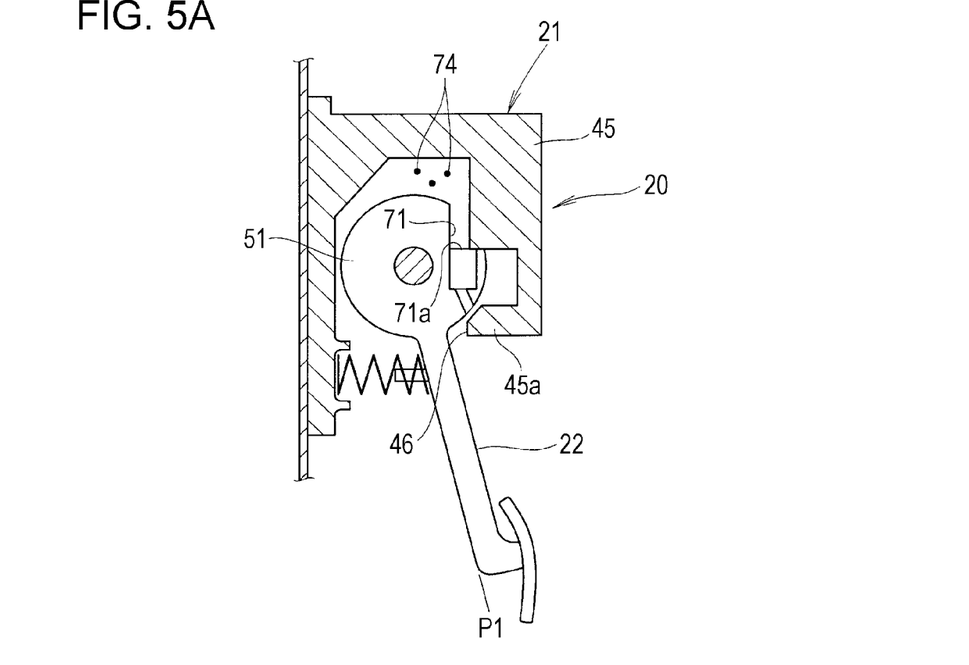
FIGS. 5A and 5B are diagrams illustrating a control pedal according to Embodiment 1 which is depressed toward the front of a vehicle body from a pedal non-depressed position (initial pedal position).

As shown in FIG. 5A, the accelerator pedal 22 is held at the pedal non-depressed position (initial pedal position) P1.

The control pedal assembly 20 has the opening 46 formed at the lower end 45a of the pedal bracket 21 (casing-like body 45).

As a result, it is conceivable that dust or other foreign matter 74 enters the housing space 47 of the pedal bracket 21 through the opening 46, particularly, during vehicle operation.

Figure 5B:
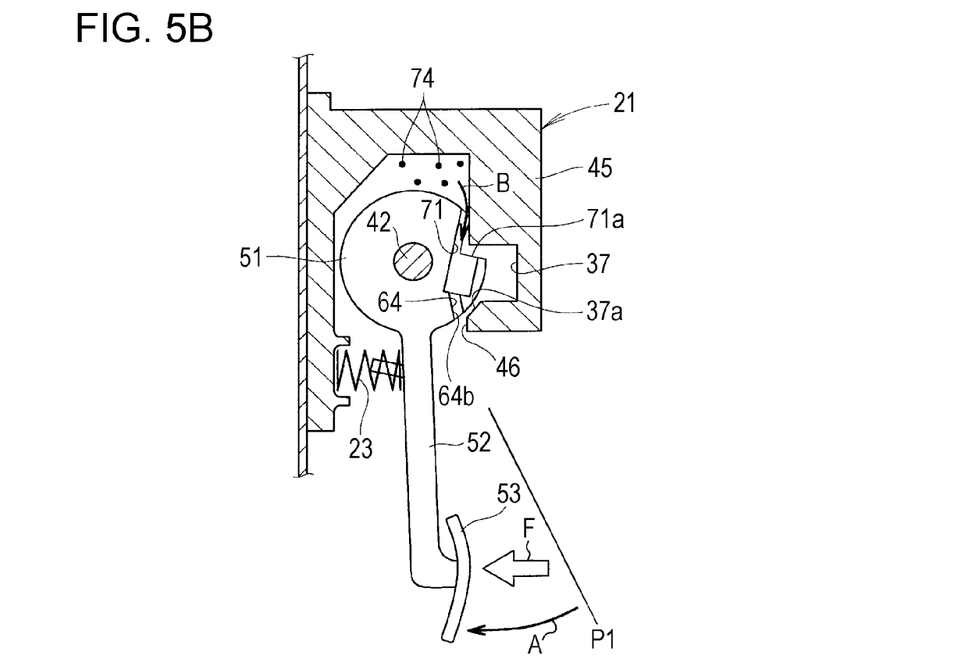

As shown in FIG. 5B, when the driver depresses the pedal 53 with his/her foot, a pedal force F acts on the pedal 53 in the direction shown by an arrow in the figure.

When the pedal force F acts on the pedal 53, the accelerator pedal 22 swings toward the front of the vehicle body from the pedal non-depressed position (initial pedal position) P1, as shown by the arrow A.

As a result of this, the outlet port 64b of the slanted guide portion 64 moves downward and opposes (is face-to-face with) the opening 46 provided at the lower end of the pedal bracket 21.

At this time, part of the foreign matter 74 in the housing space 47 drops under its own weight onto the lower end 71a of the substantially V-shaped recess 71, as shown by the arrow B.

Figure 6A:
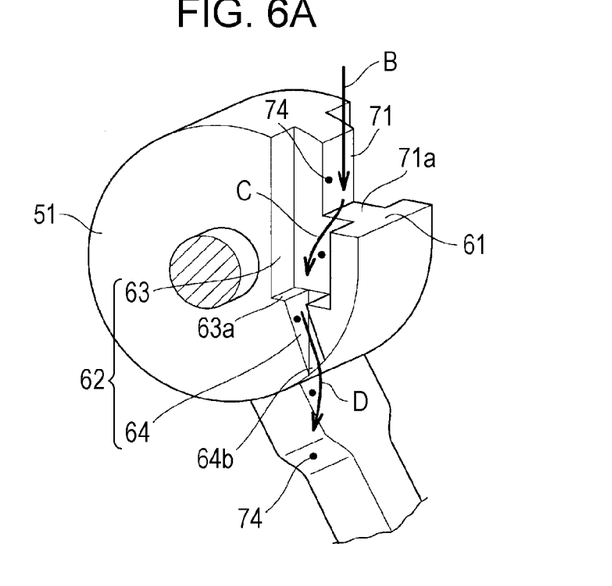
FIGS. 6A and 6B are diagrams showing a communicating portion according to Embodiment 1 through which foreign matter in a housing space is released so as to go away from the control pedal.

As shown in FIG. 6A, the foreign matter 74 that has dropped onto the lower end 71a of the substantially V-shaped recess 71 further drops onto the groove portion 63 of the left communicating portion 62 through the lower end 71a, as shown by the arrow C.

Figure 6B:
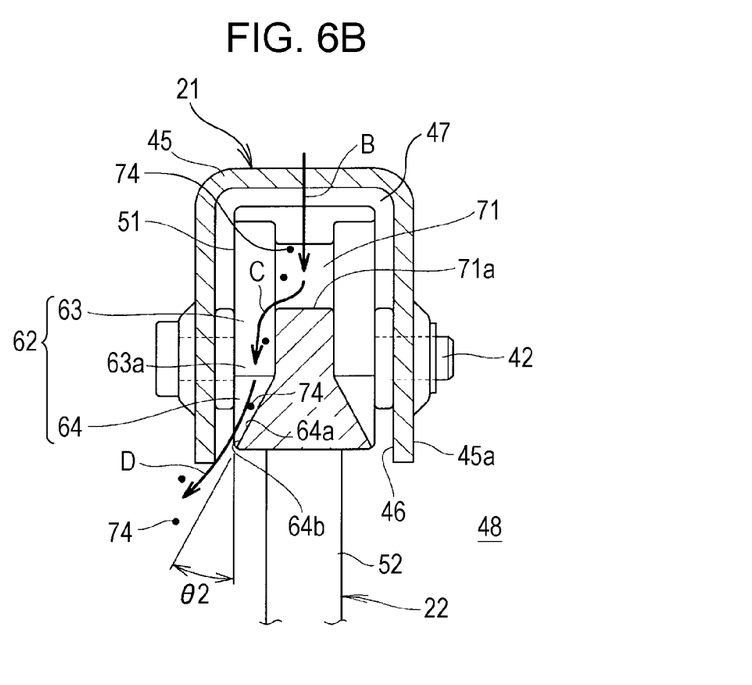

As shown in FIG. 6B, the foreign matter 74 that has reached the lower end 63a of the groove portion 63 is released to the outside space 48 of the pedal bracket 21 through the outlet port 64b of the slanted guide portion 64 and the opening 46 of the pedal bracket 21, as shown by the arrow D.

The bottom portion 64a of the slanted guide portion 64 is configured to descend at an angle of θ2 so as to extend laterally outward (toward the left side) from the lower end 63a of the groove portion 63.

With this arrangement, foreign matter 74 that has entered the groove portion 63 is guided through the slanted guide portion 64 so as to go away from the accelerator pedal 22, as shown by the arrow D, thereby ensuring that the foreign matter is kept away the accelerator pedal 22 and the opening 46.

This configuration prevents the foreign matter 74 from accumulating on the accelerator pedal 22 or around the opening 46.

Figure 7:
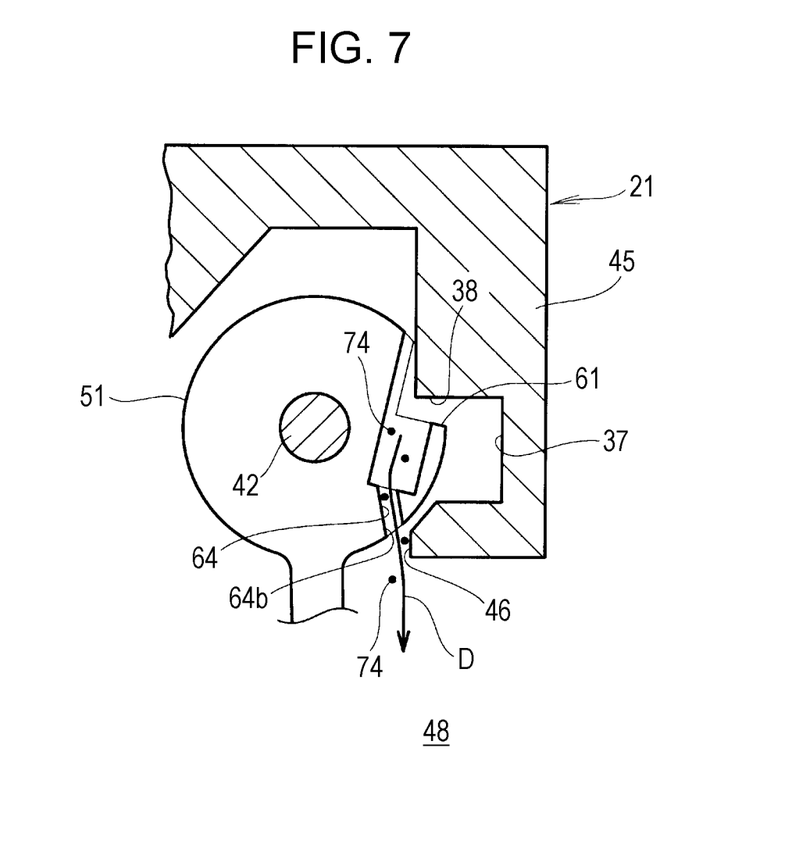
FIG. 7 is a diagram showing that foreign material is released through an opening provided in a pedal bracket when a control pedal according to Embodiment 1 is depressed.

As shown in FIG. 7, the outlet port 64b of the slanted guide portion 64 is configured to become face-to-face with the opening 46, thereby allowing the outlet port 64b to be exposed to the outside space 48.

This configuration allows the foreign matter 74 that has entered the groove portion 63 to be optimally released to the outside space 48 of the pedal bracket 21 through the slanted guide portion 64.

This prevents the foreign matter 74 from accumulating between the regulating portion 61 and the stopper 38, ensuring the operability of the accelerator pedal 22.

Increasing the operation amount of the accelerator pedal 22 shown in FIG. 5A further enhances the release of the foreign matter 74.

Next, a control pedal assembly 80 according to Embodiment 2 is described below with reference to FIGS. 8 to 11.

The reference numerals and symbols in Embodiment 2 refer to the same components as those of the control pedal assembly 20 with the same reference numerals and symbols in Embodiment 1, and repeated descriptions of the same components are omitted.

Embodiment 2

Figure 8:
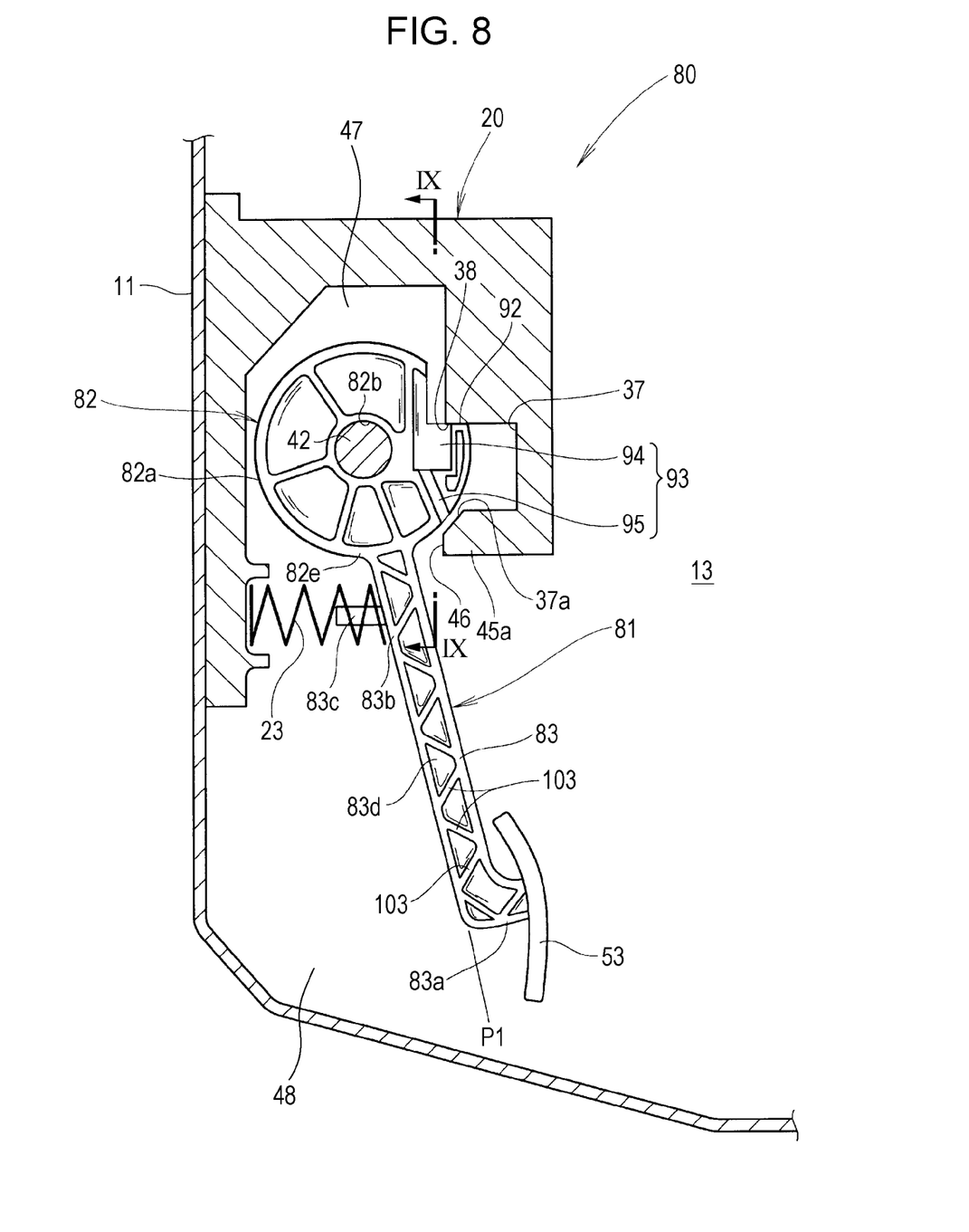
FIG. 8 is a cross-sectional view showing a control pedal assembly according to Embodiment 2 of the present invention.

As shown in FIG. 8, the control pedal assembly 80 has the same structure as the control pedal assembly 20 according to Embodiment 1, except that an accelerator pedal 81 is provided instead of the accelerator pedal 22 according to Embodiment 1.

The accelerator pedal 81 is formed of a resin material and has a base 82 supported by a support shaft 42, an arm 83 extending downward toward the rear of the vehicle body from the base 82, and a pedal 53 provided at a lower end 83a of the arm 83.

The accelerator pedal 81 shown as an example is formed of a resin material, but may be formed of other materials such as steel and cast iron.

Figure 9:
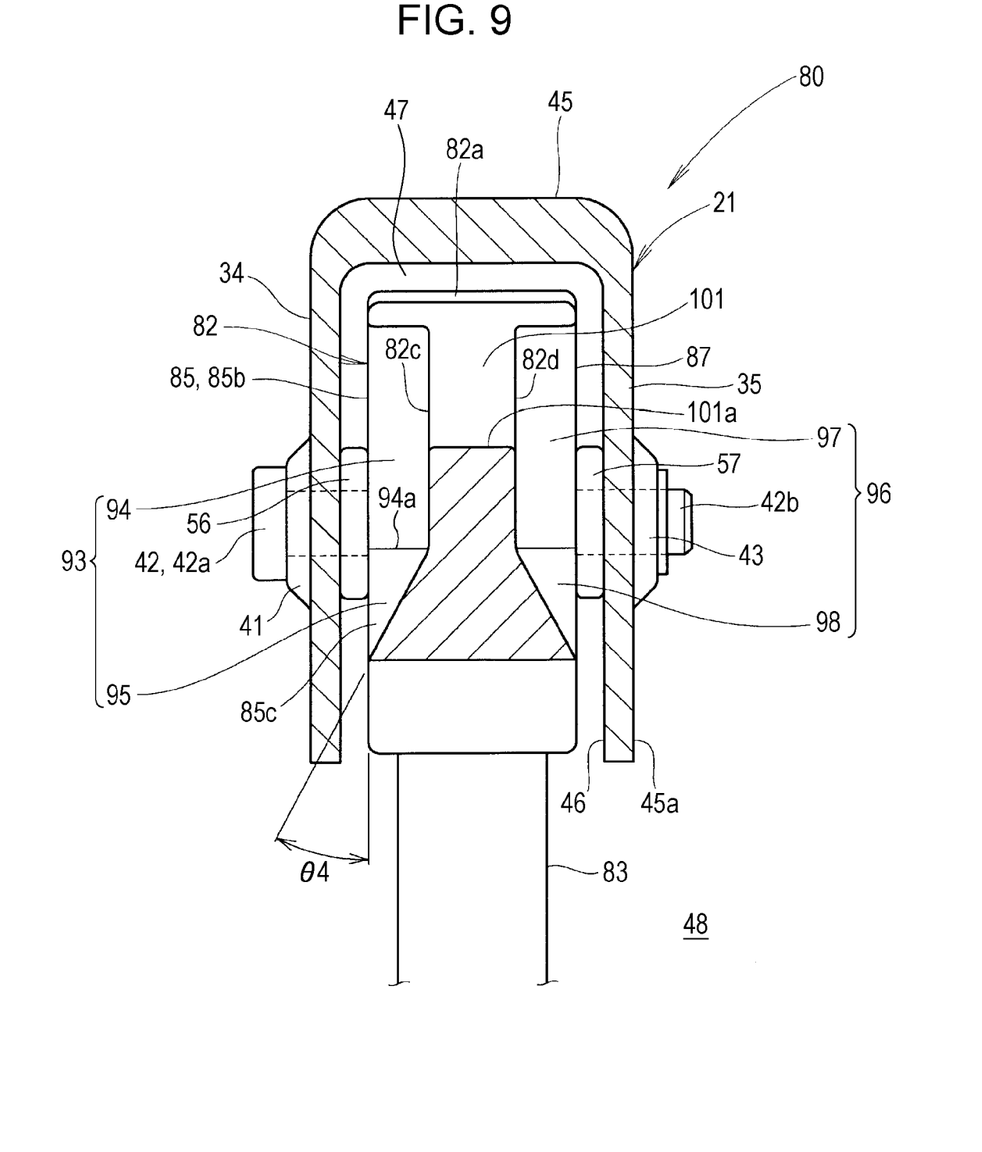
FIG. 9 is a view of section taken along line IX-IX of FIG. 8.
Figure 10:
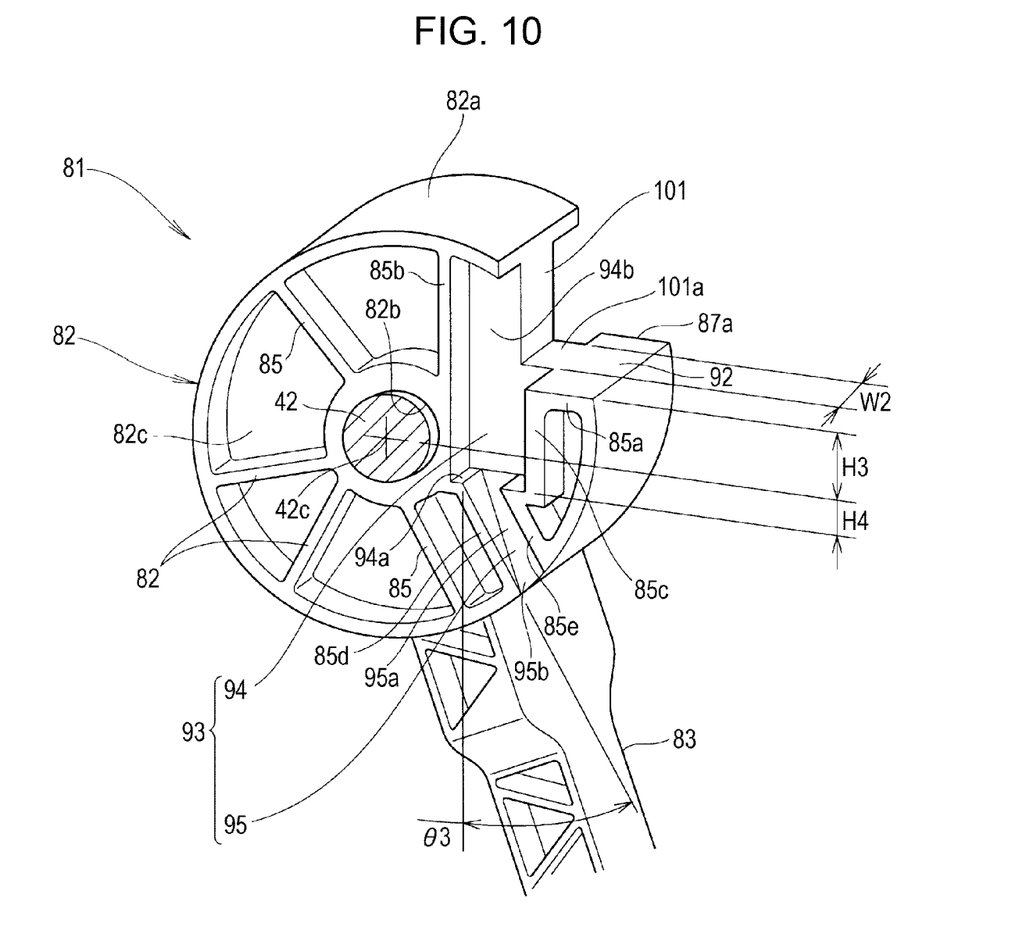
FIG. 10 is a perspective view of a base of a control pedal according to Embodiment 2.

As shown in FIGS. 9 and 10, the base 82 has a circumferential portion 82a formed in a substantially circular shape as seen from the side and a supporting hole 82b penetrating therethrough in the middle thereof. The support shaft 42 is inserted through the supporting hole 82b.

The base 82 is provided at a left side (side of the pedal) 82c thereof with a plurality of left reinforcement ribs (reinforcement ribs) 85 between a circumferential portion 82a and the supporting hole 82b and also provided at a right side (side of the pedal) 82d thereof with a plurality of left reinforcement ribs (reinforcement ribs) 87 between a circumferential portion 82a and the supporting hole 82b.

In addition, the base 82 has a regulating portion 92 that can come into contact with the stopper 38 (see FIG. 2) at the rear of the support shaft 42 relative to the vehicle body and has left and right communicating portions 93, 96 formed between the regulating portion 92 and the support shaft 42.

The regulating portion 92 is horizontally formed at the rear of the support shaft 42 relative to the vehicle body in a substantially V-shaped recess 101 formed in the circumferential portion 82a of the base 82 in such a manner as to be located adjacent to the circumferential portion 82a at a height H3 above a center 42c of the support shaft 42.

In other words, the regulating portion 92 is formed of part of a lower end 101a of the substantially V-shaped recess 101. A width W2 of the lower end 101a is set relatively narrower.

Making the width W2 of the lower end 101a relatively narrow can prevent dust or other foreign matter from accumulating on the lower end 101a.

The regulating portion 92 is provided in the housing space 47.

In addition, the regulating portion 92 is made using the left and right reinforcement ribs 85a, 87a.

As shown in FIG. 8, the operation amount of the accelerator pedal 81 can be regulated by causing the regulating portion 92 to come into contact with the stopper 38.

Regulating the operation amount of the accelerator pedal 81 allows the accelerator pedal 81 to be held at a pedal non-depressed position (initial pedal position) P1.

As shown in FIGS. 9 and 10, the left communicating portion 93 is formed at the rear of the support shaft 42 relative to the vehicle body in such a manner as to be located just under the regulating portion 92 between the base 82 and the pedal bracket 21 (left side wall 34).

The left communicating portion 93 communicates with a space (namely, housing space 47) above the base 82 and a space (namely, space 48 outside of the casing-like body 45) below the base 82.

The left communicating portion 93 has a groove portion 94 formed in the left side 82c of the base 82 and a slanted guide portion 95 extending downward from the groove portion 94.

The groove portion 94 is formed of left reinforcement ribs 85b, 85c in the left side 82c so as to extend downward.

Forming the groove portion 94 using the left reinforcement ribs 85b, 85c ensures the rigidity of the base 82 (namely, the accelerator pedal 81) and facilitates fabrication of the groove portion 94.

Specifically, the groove portion 94 is formed in such a manner that its upper end communicates with the circumferential portion 82a of the base 82 and the substantially V-shaped recess 101 and that its lower end 94a is disposed a distance H4 below the center 42c of the support shaft 42. The lower end 94a of the groove portion 94 is substantially horizontally formed just below the regulating portion 92.

The bottom portion 94b of the groove portion 94 consists of part of the left side 82c of the base 82.

The slanted guide portion 95 formed of left reinforcement ribs 85d, 85e extends downward from the lower end 94a of the groove portion 94.

Forming the slanted guide portion 95 using left reinforcement ribs 85d, 85e ensures the rigidity of the base 82 (namely, the accelerator pedal 81) and facilitates fabrication of the slanted guide portion 95.

The slanted guide portion 95 descends at an angle of θ3 in the left side 82c of the base 82 so as to extend toward the rear of the vehicle body from the lower end 94a of the groove portion 94, and a bottom portion 95a descends at an angle of θ4 so as to extend laterally outward (toward the left side) from the lower end 94a of the groove portion 94.

As described above, the groove portion 94 is formed using the left reinforcement ribs 85b, 85c and the slanted guide portion 95 is formed using the left reinforcement ribs 85d, 85e.

Accordingly, the left communicating portion 93 (the groove portion 94 and the slanted guide portion 95) can be formed using the left reinforcement ribs 85b, 85c and the left reinforcement ribs 85d, 85e.

This arrangement ensures the rigidity of the base 82 (namely, the accelerator pedal 81) and facilitates fabrication of the left communicating portion 93.

Like the left communicating portion 93, the right communicating portion 96 is formed at the rear of the support shaft 42 relative to the vehicle body in such a manner as to be located just under the regulating portion 92 between the base 82 and the pedal bracket 21 (right side wall 35).

The right communicating portion 96 communicates with a space (namely, housing space 47) above the base 82 and a space (namely, space 48 outside of the casing-like body 45) below the base 82.

The right communicating portion 96 has a groove portion 97 formed in the right side 82d of the base 82 and a slanted guide portion 98 extending downward from the groove portion 97.

The right communicating portion 96 and the left communicating portion 93 are bilaterally symmetric, and detailed description of the right communicating portion 96 is omitted.

As shown in FIG. 8, the arm 83 extends downward toward the rear of the vehicle body from the lower end 82e of the base 82 and has a spring support 83c formed at an upper end 83b thereof.

The arm 83 has a plurality of reinforcement ribs 103 formed on each side 83d thereof.

Next, an example of releasing the foreign matter 74 that has entered the housing space 47 of the control pedal assembly 80 is described below with reference to FIGS. 11A and 11B. Since the left and right communicating portions 93, 96 are bilaterally symmetric, only the left communicating portion 93 is described with reference to FIGS. 11A and 11B for ease of understanding how the foreign matter is released.

Figure 11A:
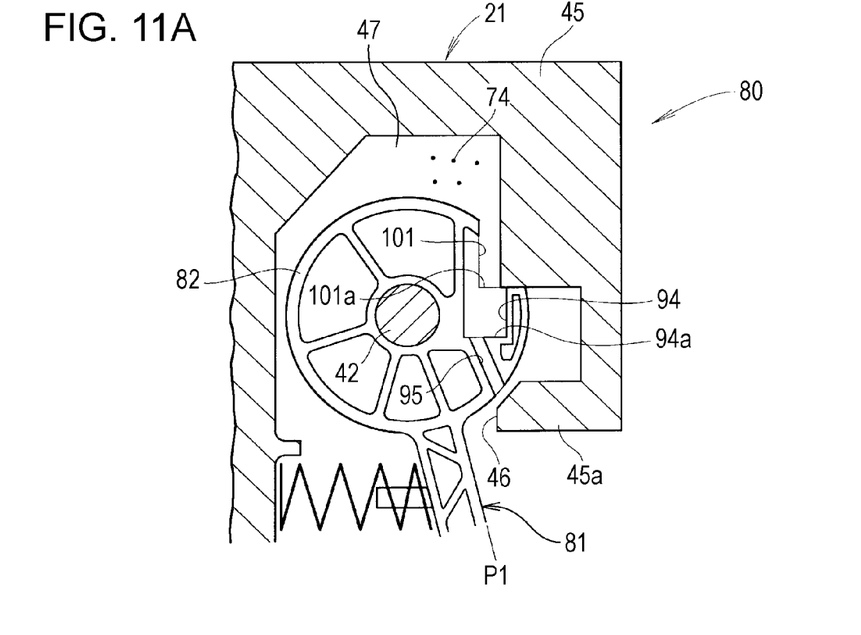
FIGS. 11A and 11B are diagrams showing a communicating portion provided in a control pedal assembly according to Embodiment 2, through which foreign matter in a housing space is released to the outside space.

As shown in FIG. 11A, the accelerator pedal 81 is held at the pedal non-depressed position (initial pedal position) P1.

The control pedal assembly 80 has the opening 46 formed at the lower end 45a of the pedal bracket 21 (casing-like body 45).

As a result, it is conceivable that dust or other foreign matter 74 enters the housing space 47 of the pedal bracket 21 through the opening 46, particularly, during vehicle operation.

Figure 11B:
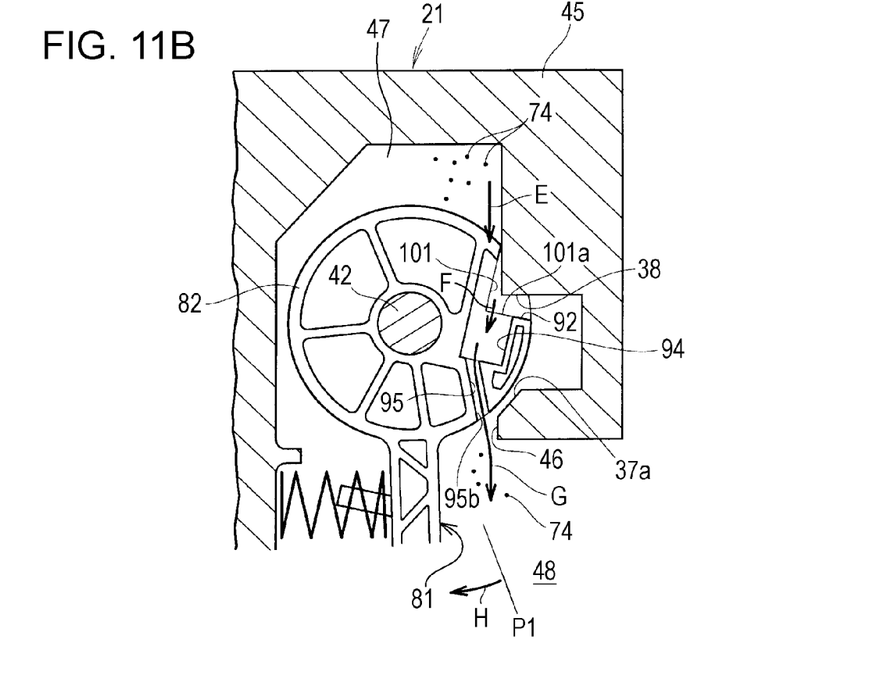

As shown in FIG. 11B, when the driver depresses the pedal 53 (see FIG. 8) with his/her foot, a pedal force acts on the pedal 53.

When the pedal force acts on the pedal 53, the accelerator pedal 81 swings toward the front of the vehicle body from the pedal non-depressed position (initial pedal position) P1, as shown by the arrow H.

As a result of this, the outlet port 95b of the slanted guide portion 95 moves away from the slanted surface 37a and becomes face-to-face with the opening 46.

At this time, part of the foreign matter 74 in the housing space 47 drops under its own weight onto the lower end 101a of the substantially V-shaped recess 101, as shown by the arrow E.

The foreign matter 74 that has dropped on the lower end 101a of the substantially V-shaped recess 101 further drops to the groove portion 94 of the left communicating portion 93 through the lower end 101a, as shown by the arrow F.

The foreign matter 74 that has reached the lower end 94a of the groove portion 94 is optimally released to the outside space 48 of the pedal bracket 21 through the slanted guide portion 95 and the opening 46 of the pedal bracket 21, as shown by the arrow G.

This configuration prevents the foreign matter 74 from accumulating between the regulating portion 92 and the stopper 38, ensuring the operability of the accelerator pedal 81.

Increasing the operation amount of the accelerator pedal 81 further enhances the release of the foreign matter 74.

As described above, the control pedal assembly 80 according to Embodiment 2 provides the same advantageous effect as the control pedal assembly 20 according to Embodiment 1.

In addition, the control pedal assembly 80 according to Embodiment 2 has the left communicating portion 93 formed using the left reinforcement ribs 85b, 85c and the left reinforcement ribs 85d, 85e, thereby ensuring the rigidity of the base 82 (namely, the accelerator pedal 81) and facilitating the fabrication of the left communicating portion 93.

The embodiment of the present invention is typically described with reference to, but not limited to, Embodiments 1 and 2. Various modifications are conceivable.

For example, although the control pedal assembly 20, 80 is applied to an accelerator pedal in Embodiments 1 and 2 described above, the embodiment of the present invention can also be applied to other pedal such as a brake pedal.

Although both the left communicating portion 62, 93 and the right communicating portion 66, 96 are provided in the accelerator pedal 22, 81 in Embodiments 1 and 2, either one of the left communicating portion 62, 93 and the right communicating portion 66, 96 can be provided in the accelerator pedal 22, 81.

The vehicle body 10, the control pedal assembly 20, 80, the pedal bracket 21, the accelerator pedal 22, 81, the compression spring 23, the support shaft 42, the regulating portion 61, 92, the left communicating portion 62, 93, the groove portion 63, 67, 94, 97, the slanted guide portion 64, 68, 95, 98, the right communicating portion 66, 96, and the left reinforcement rib 85b to 85e, which are described in Embodiments 1 and 2, are not limited to those described above with regard to shape and structure, but can be modified as necessary.

The embodiment of the present invention can be applied to a motor vehicle provided with a control pedal assembly having a control pedal that is swingably supported by a support shaft disposed in a housing space of a pedal bracket.

The embodiment of the present invention provides a control pedal assembly having a pedal bracket that is secured to a vehicle body and has a housing space therein and a control pedal that is swingably supported by a support shaft disposed in the housing space of the pedal bracket, the control pedal being urged by an urging device toward the rear of a vehicle body, wherein a communicating portion communicating with a space above the control pedal and a space below the control pedal is provided at the rear of the support shaft relative to the vehicle body between the control pedal and the pedal bracket.

With this arrangement, the pedal bracket can cover the vicinity of the support shaft (specifically, the base of the control pedal), which makes the ingress of dust or other foreign matter into the control pedal side difficult even in strong winds.

In addition, since the support shaft that supports the control pedal is located at an upper end of the control pedal, the space above the control pedal becomes a housing space and the space below the control pedal becomes an outside space.

With this arrangement, if dust or other foreign matter enters the housing space of the pedal bracket, the foreign matter can be released to the outside space through the communicating portion.

This arrangement prevents foreign matter that has entered the housing space of the pedal bracket from accumulating on the control pedal, thereby ensuring the operability of the control pedal.

In the embodiment, a regulating portion for regulating an operation amount of the control pedal may be provided in the housing space, and the communicating portion is provided just under the regulating portion.

With this arrangement, foreign matter that has entered the housing space of the pedal bracket can be released to the outside space through the communicating portion provided just under the regulating portion, thereby preventing foreign matter that has entered the housing space from becoming attached to the regulating portion.

This arrangement ensures the operability of the control pedal when a brake pedal force is released from a depressed control pedal.

In the embodiment, the communicating portion may have a groove portion formed on a side of the control pedal and a slanted guide portion that is formed on a side of the control pedal and extends laterally outward from the groove portion in such a manner as to be slanted.

With this arrangement, dust or other foreign matter that has entered the groove portion can be guided through the slanted guide portion in such a manner as to go away from the accelerator pedal, thereby ensuring that the foreign matter is kept away from the control pedal.

In the embodiment, the slanted guide portion may descend toward the rear of the vehicle body.

With this arrangement, the slanted guide portion can be moved downward when the control pedal is depressed to the front of the vehicle with a brake pedal force.

Causing the slanted guide portion to move downward allows the slanted guide portion to be exposed to the outside via a space below the pedal bracket.

This arrangement allows the dust or other foreign matter that has entered the groove portion to be optimally released to the outside of the pedal bracket through the slanted guide portion.

In the embodiment, the communicating portion may be formed using a reinforcement rib of the control pedal.

Forming the communicating portion using the reinforcement rib can ensure the rigidity of the control pedal and facilitate the fabrication of the communicating portion.

Obviously, numerous modifications and variations of the present invention are possible in light of the above teachings. It is therefore to be understood that within the scope of the appended claims, the invention may be practiced otherwise than as specifically described herein.

What is claimed is:

1. A control pedal assembly comprising:
   a pedal bracket secured to a vehicle body and having a housing space;
   a control pedal swingably supported by a support shaft disposed in the housing space of the pedal bracket;
   an urging device to urge the control pedal toward a rear of the vehicle body; and
   a communicating portion provided at a rear of the support shaft relative to the vehicle body between the control pedal and the pedal bracket to connect a space above the control pedal and a space below the control pedal,
   wherein the communicating portion has a first groove portion formed on a first side of the control pedal and a first slanted guide portion formed on the first side, and
   the first slanted guide portion extends laterally outward from the first groove portion in such a manner as to be slanted.

2. The control pedal assembly according to claim 1, wherein the first slanted guide portion descends toward the rear of the vehicle body.

3. The control pedal assembly according to claim 2, wherein a regulating portion configured to regulate an operation amount of the control pedal is provided in the housing space, and
   the first slanted guide portion descends toward the rear of the vehicle body when the regulating portion regulates the operation amount of the control pedal.

4. The control pedal assembly according to claim 1, wherein the communicating portion further has a second groove portion formed on a second side of the control pedal and a second slanted guide portion formed on the second side,
   the second side is disposed on an opposite side of the first side, and
   the second slanted guide portion extends laterally outward from the second groove portion in such a manner as to be slanted.

5. The control pedal assembly according to claim 4, wherein the second slanted guide portion descends toward the rear of the vehicle body.

6. The control pedal assembly according to claim 5, wherein a regulating portion configured to regulate an operation amount of the control pedal is provided in the housing space, and
   the second slanted guide portion descends toward the rear of the vehicle body when the regulating portion regulates the operation amount of the control pedal.

* * * * *